(12) United States Patent
Shigeta et al.

(10) Patent No.: US 7,046,604 B2
(45) Date of Patent: May 16, 2006

(54) OPTICAL DISC DRIVING APPARATUS

(75) Inventors: Takaharu Shigeta, Kanagawa (JP); Hiroki Kobayashi, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 302 days.

(21) Appl. No.: 10/772,679

(22) Filed: Feb. 5, 2004

(65) Prior Publication Data
US 2004/0156288 A1 Aug. 12, 2004

(30) Foreign Application Priority Data
Feb. 6, 2003 (JP) ............................. 2003-030076

(51) Int. Cl.
*G11B 7/00* (2006.01)
(52) U.S. Cl. .............................. 369/53.18; 369/44.32; 318/685
(58) Field of Classification Search ..................... None
See application file for complete search history.

(56) References Cited

U.S. PATENT DOCUMENTS

| | | | | |
|---|---|---|---|---|
| 5,805,540 A * | 9/1998 | Kitai et al. | .............. | 369/53.29 |
| 6,088,185 A * | 7/2000 | Ratliff et al. | ............ | 360/77.03 |
| 6,140,792 A * | 10/2000 | Kameyama et al. | ........ | 318/685 |
| 6,249,495 B1 * | 6/2001 | Okada et al. | ............ | 369/44.28 |
| 6,608,455 B1 * | 8/2003 | Suzuki | ....................... | 318/114 |

* cited by examiner

*Primary Examiner*—Thang V. Tran
(74) *Attorney, Agent, or Firm*—Pearne & Gordon LLP (57) ABSTRACT

Herein disclosed is a optical disc driving apparatus for driving an optical disc having a central axis, comprising: a turntable having a central axis, said turntable being adapted to retain an optical disc under the condition that said central axis of said turntable is axially aligned with said central axis of said optical disc; an optical pickup unit movable toward and away from said central axis of said turntable, said optical pickup unit being adapted to write or retrieve information from said optical disc retained by said turntable; a stepping motor having a plurality of coils; a detecting unit for detecting an exterior vibration while being vibrated in response to said exterior vibration; a driver IC for controlling said stepping motor to have said stepping motor assume two different operation states consisting of a first operation state to drive said stepping motor to ensure that said optical pickup unit is moved toward and away from said central axis of said turntable, and a second operation state to drive said stepping motor to ensure that said optical pickup unit fails to be moved toward and away from said central axis of said turntable; and a control signal producing unit for producing a control signal to have said driver IC supply control currents in association with said exterior vibration detected by said detecting unit to said coils of said stepping motor to have said stepping motor assume said second operation state after judging whether or not said exterior vibration detected by said detecting unit is larger in amplitude than a predetermined threshold level.

9 Claims, 8 Drawing Sheets

FIRST CURRENT TO BE SUPPLIED TO FIRST COIL 191

SECOND CURRENT TO BE SUPPLIED TO SECOND COIL 192

THIRD CURRENT TO BE SUPPLIED TO THIRD COIL 193

FORTH CURRENT TO BE SUPPLIED TO FORTH COIL 194

OPTICAL DISC DRIVING APPARATUS

BACKGROUND OF THE INVENTION

1. Field of the Invention

The present invention relates to an optical disc driving apparatus, and more particularly to an optical disc driving apparatus for driving an optical disc to have information memorized in the optical disc, or to retrieve information form the optical disc.

2. Description of the Related Art

Up until now, there have been proposed a wide variety of conventional optical disc driving apparatus of this type one typical example of which is disclosed in Japanese Patent Laying-Open Publication No. H10-149639.

The conventional optical disc driving apparatus comprises a turntable having a central axis and an optical pickup unit movable toward and away from the central axis of the turntable. The turntable is adapted to retain an optical disc under the condition that the central axis of the turntable is axially aligned with the central axis of the optical disc, while the optical pickup unit is adapted to write or retrieve information from the optical disc retained by the turntable.

The conventional optical disc driving apparatus further comprises a stepping motor having a plurality of coils, and a driver IC for controlling the stepping motor to have the stepping motor assume two different operation states consisting of a first operation state to allow the stepping motor to ensure that the optical pickup unit is moved toward and away from the central axis of the turntable, and a second operation state to allow the stepping motor to produce a torque larger than a detent torque to ensure that the optical pickup unit fails to be moved toward and away from the central axis of the turntable.

The optical disc driving apparatus thus constricted as previously mentioned, however, encounters such a problem that the relatively high calorific value tends to be produced by the control currents to be supplied to the coils of the stepping motor in the coils of the stepping motor when the rotation shaft of the stepping motor fails to be moved around its central axis without being affected by the exterior vibration.

SUMMARY OF THE INVENTION

It is, therefore, an object of the present invention to provide an optical disc driving apparatus which can reduce the calorific value to be produced in the stepping motor to ensure that the rotation shaft of the stepping motor fails to be rotatably moved around its rotation axis without being affected by the exterior vibration.

According to the first aspect of the present invention, there is provided an optical disc driving apparatus, comprising: a stepping motor having a plurality of coils; a detecting unit for detecting an exterior vibration while being vibrated in response to the exterior vibration; a driver IC for supplying control currents for controlling the stepping motor to the coils of the stepping motor to have the stepping motor assume two different operation states consisting of a first operation state to drive the stepping motor to ensure that the rotation shaft of stepping motor is rotatably moved around its rotation axis, and a second operation state to drive the stepping motor to ensure that the rotation shaft of stepping motor fails to be rotatably moved around its rotation axis; and a control signal producing unit for producing a control signal to have the driver IC supply control currents in association with the exterior vibration detected by the detecting unit to the coils of the stepping motor to have the stepping motor assume the second operation state after judging whether or not the exterior vibration detected by the detecting unit is larger in amplitude than a predetermined threshold level.

According to the second aspect of the present invention, there is provided an optical disc driving apparatus for driving an optical disc having a central axis, comprising: a turntable having a central axis, the turntable being adapted to retain an optical disc under the condition that the central axis of the turntable is axially aligned with the central axis of the optical disc; an optical pickup unit movable toward and away from the central axis of the turntable, the optical pickup unit being adapted to write or retrieve information from the optical disc retained by the turntable; a stepping motor having a plurality of coils; a detecting unit for detecting an exterior vibration while being vibrated in response to the exterior vibration; a driver IC for supplying control currents for controlling the stepping motor to the coils of the stepping motor to have the stepping motor assume two different operation states consisting of a first operation state to drive the stepping motor to ensure that the optical pickup unit is moved toward and away from the central axis of the turntable, and a second operation state to drive the stepping motor to ensure that the optical pickup unit fails to be moved toward and away from the central axis of the turntable; and a control signal producing unit for producing a control signal to have the driver IC supply control currents in association with the exterior vibration detected by the detecting unit to the coils of the stepping motor to have the stepping motor assume the second operation state after judging whether or not the exterior vibration detected by the detecting unit is larger in amplitude than a predetermined threshold level.

The detecting unit may be adapted to detect the exterior vibration while being vibrated in the direction toward the central axis of the turntable from the optical pickup unit and vice versa.

The control signal producing unit may be adapted to produce a control signal to have the stepping motor assume the second operation state after deciding whether or not to supply the control currents to the coils of the stepping motor on the basis of results detected by the detecting unit.

The control signal producing unit may be adapted to produce a control signal to have the stepping motor assume the second operation state after deciding whether or not to supply the control currents to the coils of the stepping motor by judging whether or not the exterior vibration detected by the detecting unit is larger in amplitude than the predetermined threshold level in a predetermined period of time.

The control signal producing unit may be adapted to produce a control signal to have the stepping motor assume the second operation state by calculating products of predetermined coefficient values and the last control currents to be respectively supplied to the coils of the stepping motor just before having the stepping motor assume the second operation state, the predetermined coefficient values being equal to one another, and before having the driver IC supply the control currents respectively equal to the products of the predetermined coefficient values and the control currents memorized therein.

The control signal producing unit may be adapted to produce a control signal to have the stepping motor assume the second operation state after producing coefficient values in response to results detected by the detecting unit, calculating products of the coefficient values and the last control currents to be respectively supplied to the coils of the stepping motor just before having the stepping motor assume the second operation state, the predetermined coefficient values being equal to one another, and having the driver IC supply the control currents respectively equal to the products of the predetermined coefficient values and the control currents memorized therein.

The control signal producing unit may be adapted to produce a control signal to have the stepping motor assume the second operation state when any one of the control currents to be respectively supplied by the driver IC to the coils of the stepping motor is equal in amplitude to an extreme value.

According to the third aspect of the present invention, there is provided an electronic apparatus to be installed into an automotive vehicle, the electronic apparatus comprising an optical disc driving apparatus for driving an optical disc having a central axis, comprising: a turntable having a central axis, the turntable being adapted to retain an optical disc under the condition that the central axis of the turntable is axially aligned with the central axis of the optical disc; an optical pickup unit movable toward and away from the central axis of the turntable, the optical pickup unit being adapted to write and retrieve information from the optical disc retained by the turntable; a stepping motor having a plurality of coils; a detecting unit for detecting an exterior vibration while being vibrated in response to the exterior vibration; a driver IC for supplying control currents for controlling the stepping motor to the coils of the stepping motor to have the stepping motor assume two different operation states consisting of a first operation state to drive the stepping motor to ensure that the optical pickup unit is moved toward and away from the central axis of the turntable, and a second operation state to drive the stepping motor to ensure that the optical pickup unit fails to be moved toward and away from the central axis of the turntable; and a control signal producing unit for producing a control signal to have the driver IC supply control currents in association with results detected by the detecting unit to the coils of the stepping motor to have the stepping motor assume the second operation state after judging whether or not the exterior vibration detected by the detecting unit is larger in amplitude than a predetermined threshold level.

BRIEF DESCRIPTION OF THE DRAWINGS

The features and advantages of an optical disc driving apparatus according to the present invention will be more clearly understood from the following description taken in conjunction with the accompanying drawings in which.

DESCRIPTION OF THE PREFERRED EMBODIMENTS

The following description will be directed to the preferred embodiment of the optical disc driving apparatus according to the present invention.

The constitution of the preferred embodiment of the optical disc driving apparatus according to the present invention will now be described hereinafter with reference to FIGS. 1 to 8.

Figure 1:
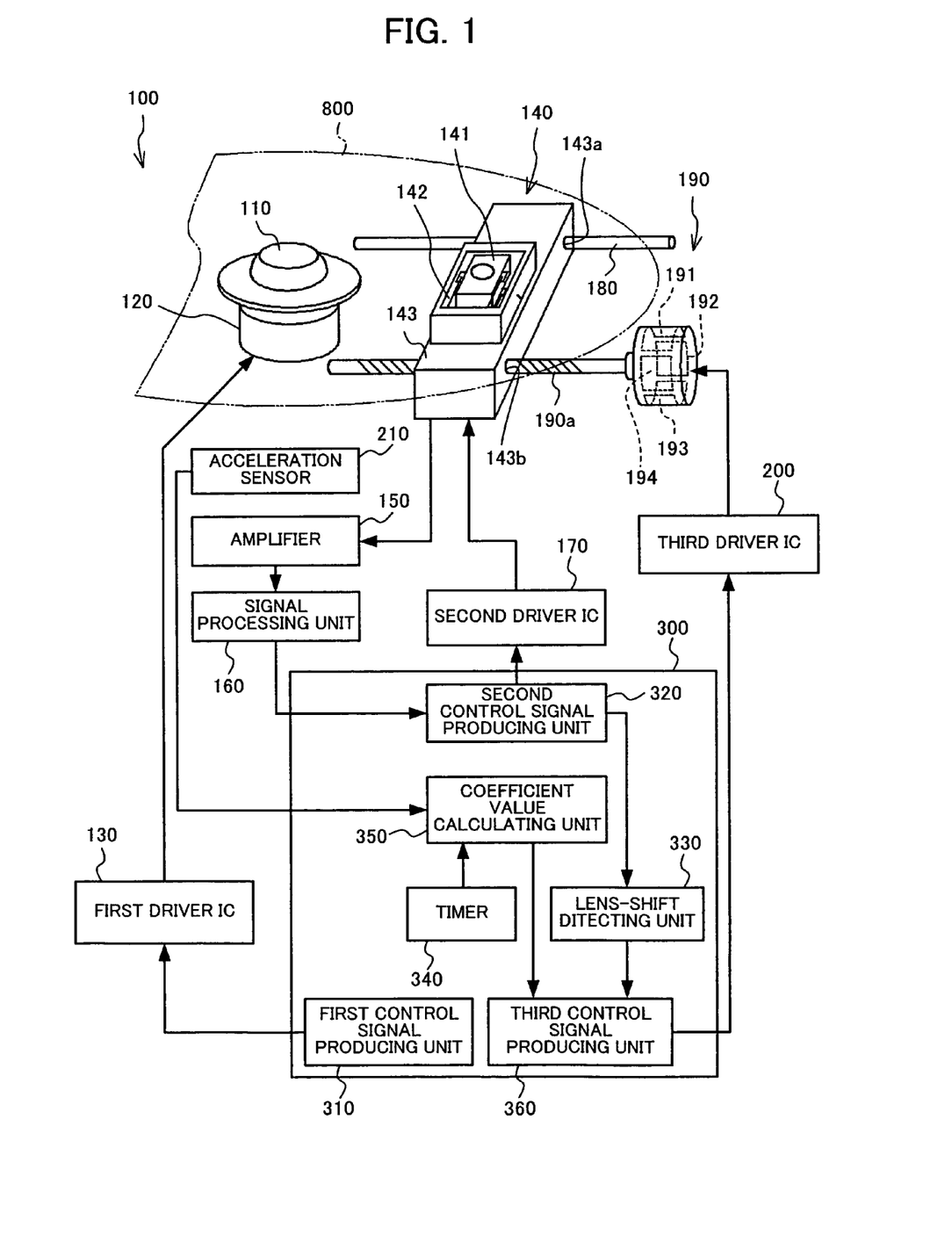
FIG. 1 is a block diagram of the optical disc driving apparatus according to the preferred embodiment of the present invention.

The optical disc driving apparatus 100 is shown in FIG. 1 as comprising a turntable 110 having a central axis. The turntable 110 is adapted to retain an optical disc 800 such as for example Compact Disc (simply referred to as "CD") and Digital Versatile Disc (simply referred to as "DVD") under the condition that the central axis of the turntable 110 is axially aligned with a central axis of the optical disc 800.

The optical disc driving apparatus 100 further comprises a spindle motor 120 for driving the turntable 110 to have the optical disc 800 retained by the turntable 110 moved around the central axis of the turntable 110, and a first driver IC 130 for controlling the spindle motor 120 by supplying control currents to the spindle motor 130.

The optical disc driving apparatus 100 further comprises an optical pickup unit 140 for writing information in a spiral-shaped track of the optical disc 800 retained by the turntable 110, and retrieving the information from the optical disc 800 retained by the turntable 110.

The optical pickup unit 140 includes a base member 143, a laser device (not shown) for producing a light beam to be projected toward the optical disc 800 retained by the turntable 110, an objective lens unit 141, and an actuator 142 for driving the objective lens unit 141 to ensure that the light beam produced by the laser device is projected on the track of the optical disc 800 retained by the turntable 110.

The actuator 142 is adapted to assume two different operation states consisting of first and second operation states, the first operation state, as a focus actuator, to have the objective lens unit 141 moved toward and away from the optical disc 800 retained by the turntable 110 to ensure that the light beam produced by the laser device of the optical pickup unit 140 is focused on the track of the optical disc 800 retained by the turntable 110 through the objective lens unit 141, and a second operation state, as a tracking actuator, to have the objective lens unit 141 moved toward and away from the central axis of the turntable 110 to ensure that the light beam produced by the laser device of the optical pickup unit 140 is projected on the track of the optical disc 800 retained by the turntable 110 through the objective lens unit 141.

The base member 143 of the optical pickup unit 142 has two different end portions consisting of a first end portion having a through bore 143a formed therein, and a second portion having a nut thread 143b formed therein. the through bore 143a of the first end portion forming part of the base member 143 has a central axis, while the nut thread 143b of the second end portion forming part of the base member 143 having a central axis substantially parallel to the central axis of the through bore 143a of the first end portion forming part of the base member 143.

The optical disc driving apparatus 100 further comprises an amplifier 150 for amplifying the signal produced by the optical pickup unit 140 to produce three different signals consisting of a focus error signal, a tracking error signal, and a radio-frequency signal, a signal processing unit 160 for performing an error correction of the radio-frequency signal produced by the amplifier 150, and a second driver IC 170 for controlling the actuator 142 of the optical pickup unit 140 by supplying control currents to the actuator 142 of the optical pickup unit 140.

The optical disc driving apparatus 100 further comprises a guide shaft 180 slidably received by the through bore 143a of the first end portion forming part of the base member 143, a bolt thread 190a meshed with the nut thread 143b of the second end portion forming part of the base member 143, and a stepping motor 190 having a rotation shaft having a central axis. the bolt thread 190a has a central axis and an end portion formed with the rotation shaft of the stepping motor 190 under the condition that the central axis of the bolt thread 190a is axially aligned with the central axis of the rotation shaft of the stepping motor 190.

The guide shaft 180 has a central axis being in coplanar relationship with the central axis of the bolt thread 190a in an imaginary plane perpendicular to the central axis of the turntable. the guide shaft 180 is adapted to guide the optical pickup unit 140 to ensure that the optical pickup unit 140 is movable toward and away from the central axis of the turntable 110.

The stepping motor 190 includes a cylindrical-shaped housing having an inner surface, and four different coils consisting of first to fourth coils 191 to 194 each accommodated and equi-angularly disposed on the inner surface of the housing under the condition that the first coil 191 being in face-to-face relationship with the third coil 193, and the second coil 192 being in face-to-face relationship with the fourth coil 194.

The optical disc driving apparatus 100 further comprises an acceleration sensor 210, as detecting means, for performing a detection of an exterior vibration in the direction toward the central axis of the turntable 110 from the optical pickup unit 140 and vice versa.

The optical disc driving apparatus 100 further comprises a central processing unit (simply referred to as "CPU") 300 for producing and outputting signals to the first to third driver ICs 130, 170, and 200 in response to the signals respectively produced by the acceleration sensor 210 and the signal processing unit 160.

Here, the third driver IC 200 and the CPU 300 collectively constitute controlling means for controlling the rotation shaft of the stepping motor 190 by supplying first to fourth control currents to the first to fourth coils 191 to 194 of the stepping motor 190.

The CPU 300 includes a first control signal producing unit 310 for producing a first control signal to have the first driver IC 130 control the spindle motor 120 to ensure that the rotation shaft of the spindle motor 120 is moved around its central axis at a predetermined rotational velocity.

The base member 143 has a central axis parallel to the central axis of the turntable 110, while the objective lens unit 141 has a central axis of the turntable 110.

The CPU 300 further includes a second control signal producing unit 320 for producing a second control signal to have the second driver IC 170 control the actuator 142, and a lens-shift detecting unit 330 for detecting a distance between a current position of the objective lens unit 141 of the optical pickup unit 140 and a predetermined position of the objective lens unit 141 of the optical pickup unit 140 (hereinafter referred to as "lens-shift value") in response to the second control signal produced by the second control signal producing unit 320.

The second control signal producing unit 320 is adapted to produce the second control signal to ensure that the light beam produced by the laser device of the optical pickup unit 140 is projected and focused on the track of the optical disc 800 retained by the turntable 110 in response to the focus error signal and the tracking error signal received from the amplifier 150 through the signal processing unit 160.

The CPU 300 further includes a coefficient value setting unit 350 having first to fourth coefficient values each in association with the mean value of the exterior vibration.

Here, each of the first to fourth coefficient values is larger than zero "0", and smaller than a numerical value "1".

The coefficient value setting unit 350 is adapted to set the first to fourth coefficient values to the third control signal producing unit 360 in response to the results detected by the acceleration sensor 210 and the timer unit 340 when the rotation shaft of the stepping motor 190 fails to be rotatably moved around its rotation axis.

The coefficient value setting unit 350 is adapted to assume two different operational states consisting of a first operation state to set the first to fourth coefficient values each equal to zero "0" to the third control signal producing unit 360 under the condition that the judgment is made that the mean value of the exterior vibration detected by the acceleration sensor 210 in a predetermined period of time is smaller than the predetermined threshold value, and a second operation state to set the first to fourth coefficient values not equal to zero "0" to the third control signal producing unit 360 under the condition that the judgment is made that the mean value of the exterior vibration detected by the acceleration sensor 210 in a predetermined period of time is not smaller than the predetermined threshold value.

The CPU 300 further includes a third control signal producing unit 360 for producing a third control signal to have the third driver IC 200 control the stepping motor 190, while the third driver IC 200 is operative to control the stepping motor 190 by supplying the first to fourth control currents to the first to fourth coils 191 to 194 of the stepping motor 190 in response to the third control signal produced by the third control signal producing unit 360.

The third control signal producing unit 360 is adapted to assume two different operational modes consisting of an alignment mode to have the third driver IC 200 control the stepping motor 190 to ensure that the optical pickup unit 140 is moved toward and away from the central axis of the turntable 110, i.e., the light beam produced by the laser device of the optical pickup unit 140 is projected on each of the tracks of the optical disc 800 retained by the turntable 110 when the information memorized in the optical disc 800 retained by the turntable 110 is retrieved by the optical pickup unit 140, and a seek mode to have the third driver IC 200 control the stepping motor 190 to ensure that the optical pickup unit 140 is moved toward and away from the central axis of the turntable 110, i.e., the light beam produced by the laser device of the optical pickup unit 140 is projected on one track selected from among the tracks of the optical disc 800 retained by the turntable 110 before the information memorized in the optical disc 800 retained by the turntable 110 is retrieved by the optical pickup unit 140.

Figure 2:
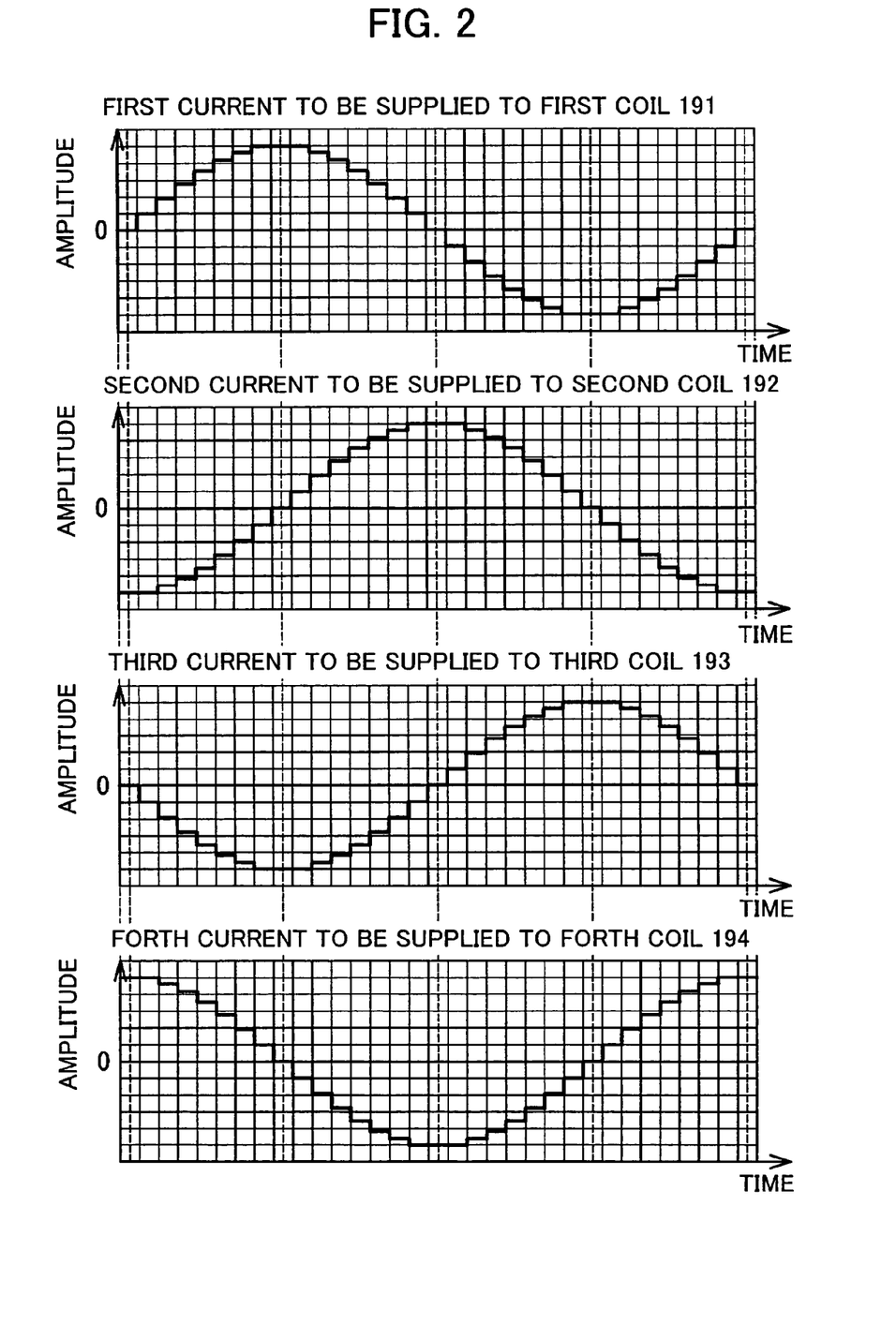
FIG. 2 is a graph showing the first to fourth control currents to be respectively supplied to the first to fourth coils of the stepping motor of the optical disc driving apparatus according to the preferred embodiment of the present invention.

Here, the first to fourth control currents to be respectively supplied to the first to fourth coils 191 to 194 of the stepping motor 190 in the alignment mode, as shown in FIG. 2, each has the shape of sine wave, a phase angle, and an extreme value. the first phase difference between the phase angle of the first control current to be supplied to the first coil 191 and the phase angle of the second control current to be supplied to the second coil 192, the second phase difference between the phase angle of the second control current supplied to the second coil 192 and the phase angle of the third control current to be supplied to the third coil 193, the third phase difference between the phase angle of the third control current to be supplied to the third coil 193 and the phase angle of the fourth control current to be supplied to the fourth coil 194, and the fourth phase difference between the phase angle of the fourth control current to be supplied to the fourth coil 194 and the phase angle of the first control current to be supplied to the first coil 191 each is equal to 90 degrees.

The third control signal producing unit 360 is adapted to judge whether or not the lens-shift value is larger than a predetermined threshold value on the basis of results detected by the lens-shift detecting unit 330.

When the judgment is made that the lens-shift value is larger than the predetermined threshold value on the basis of results detected by the lens-shift detecting unit 330, the third control signal producing unit 360 is adapted to produce a third control signal to ensure that the rotation shaft of the stepping motor 190 is pivotally moved around its rotation axis in response to the predetermined rotation angle.

When any one of the first to fourth control currents to be respectively supplied to the first to fourth coils 191 to 194 of the stepping motor 190 is equal to zero "0" or the extreme value by the third driver IC 200, the third control signal producing unit 360 is adapted to produce a third control signal to ensure that the rotation shaft of the stepping motor 190 stops to be moved around its rotation axis.

When, on the other hand, the judgment is made that the lens-shift value is not larger than the predetermined threshold value on the basis of results detected by the lens-shift detecting unit 330, the third control signal producing unit 360 is adapted to have memorized therein control current information on the first to fourth control currents to be respectively supplied to the first to fourth coils 191 to 194 of the stepping motor 190 just before the rotation shaft of the stepping motor 190 stops to be moved around its rotation axis.

When the first to fourth control currents respectively equal to zero "0" are respectively supplied to the first to fourth coils 191 to 194 of the stepping motor 190 under the condition that the rotation shaft of the stepping motor 190 fails to be moved around its rotation axis, the third control signal producing unit 360 is adapted to calculate products of the first to fourth coefficient values produced by the coefficient value producing unit 350 and the first to fourth control current values memorized therein, and to produce the third control signal to have the third driver IC 200 supply the first to fourth control currents respectively equal to the products of the first to fourth coefficient values produced by the coefficient value producing unit 350 and the first to fourth control current values memorized in the third control signal producing unit 360 to the first to fourth coils 191 to 194 of the stepping motor 190.

When the judgment is made that the lens-shift value is not larger than the predetermined threshold value on the basis of results detected by the lens-shift detecting unit 330, and furthermore the rotation shaft of the stepping motor 190 fails to be moved around its rotation axis under the condition that at least one of the first to fourth control currents to be supplied by the third driver IC 200 to the first to fourth coils 191 to 194 of the stepping motor 190 is equal to zero "0", the third control signal producing unit 360 is adapted to produce the third control signal to have the third driver IC 200 supply the first to fourth control currents respectively equal to results detected by the lens-shift detecting unit 330 to the first to fourth coils 191 to 194 of the stepping motor 190.

Figure 3:
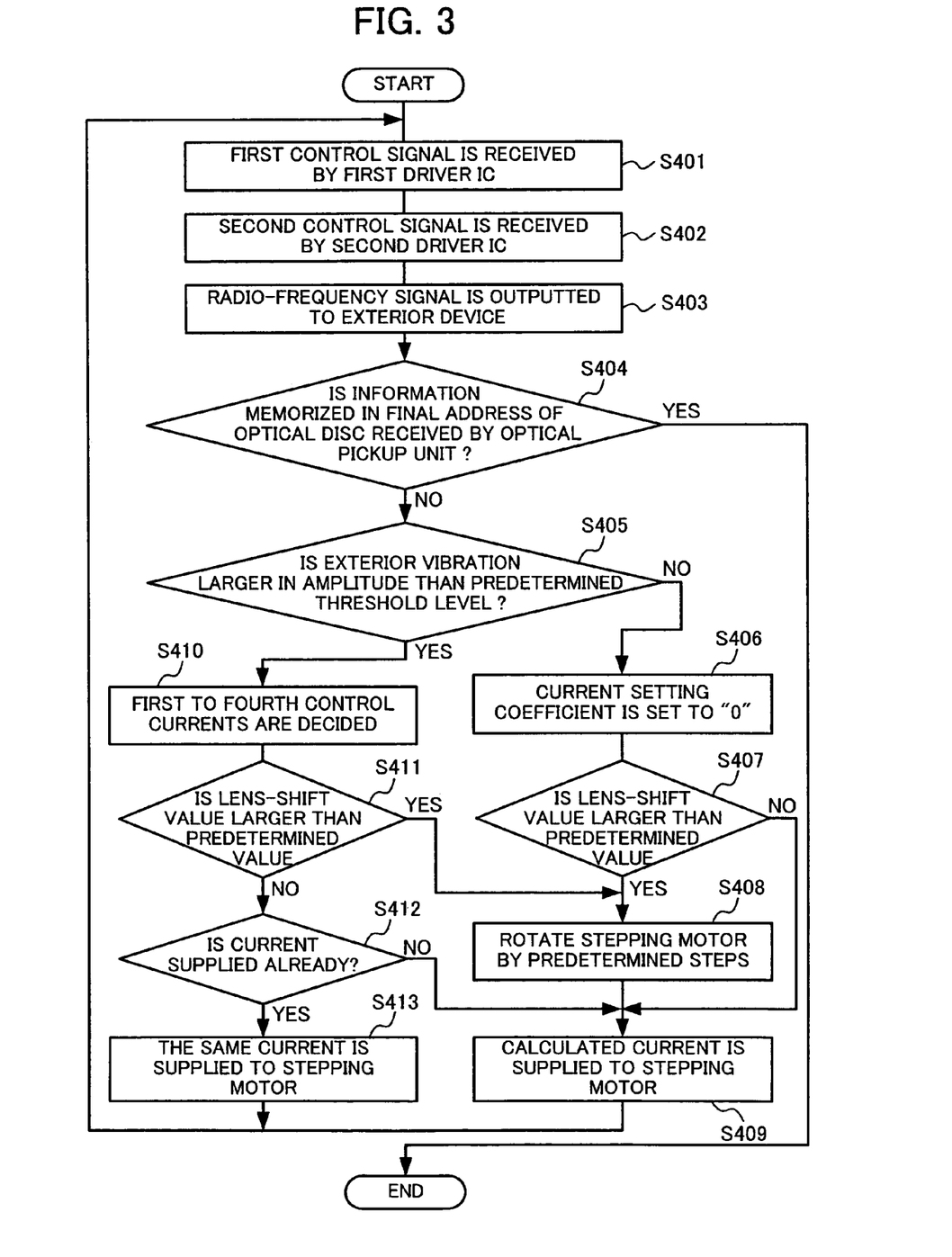
FIG. 3 is a flowchart showing an operation of the optical disc driving apparatus according to the preferred embodiment of the present invention.

The operation of the optical disc driving apparatus according to the preferred embodiment of the present invention will be described hereinafter with reference to FIG. 3.

The steps of the preferred embodiment of the optical disc driving apparatus according to the present invention is entirely the same as those of the conventional optical disc driving apparatus except for the steps appearing in the following description. Therefore, only the steps of the preferred embodiment of the optical disc driving apparatus different from those of the conventional optical disc driving apparatus will be described in detail hereinafter.

When the information recorded in the optical disc 800 supported by the turntable unit 110 is obtained by the optical pickup unit 140, the first control signal producing unit 310 of the CPU 300 is firstly operated to produce a first control signal to have the optical disc 800 retained by the turntable 110 move around its central axis with the predetermined rotational velocity. the first control signal produced by the first control signal producing unit 310 of the CPU 300 is received by the first driver IC 130 in the step S401.

When the first control signal produced by the first control signal producing unit 310 is received by the first driver IC 130, the spindle motor 120 is controlled by the first driver IC 130 in response to the first control signal produced by the first control signal producing unit 310, i.e., the optical disc 800 retained by the turntable unit 110 is moved around its central axis with the predetermined rotational velocity by the spindle motor 120.

When the first control signal produced by the first control signal producing unit 310 is received by the first driver IC 130, the second control signal producing unit 320 is operated to produce the second control signal to ensure that the light beam produced by the laser device of the optical pickup unit 140 is projected on the specific portion of the memory disc 800 retained by the turntable 110 in response to the focus error signal and the tracking error signal produced by the signal processing unit 160 in the step S402.

When the second control signal produced by the second control signal producing unit 320 is received by the second driver IC 170, the second driver IC 170 is operated to control the actuator 142 of the optical pickup unit 140 to ensure that the light beam produced by the laser device of the optical pickup unit 140 is projected on the specific portion of the memory disc 800 retained by the turntable 110 by allowing the objective lens unit 141 of the optical pickup unit 140 to move toward and away from the central axis of the turntable 110 in response to the second control signal produced by the second control signal producing unit 170.

The light beam is then produced and projected on the specific portion of the optical disc retained by the turntable 110. the light beam reflected by the optical disc 800 retained by the turntable 110 is then received and converted to an radio-frequency signal by the optical pickup unit 140. the radio-frequency signal converted by the optical pickup unit 140 is then amplified by the amplifier 150. the radio-frequency signal amplified by the radio-frequency amplifier 150 is then demodulated, error-corrected by the signal processing unit 160, and outputted to an external device by the CPU 300 in the step S403.

When the radio-frequency signal is outputted to the exterior device by the CPU 300, the judgment is made by the CPU 300 on whether or not either the information memorized in the final address of the memory area of the optical disc 800 or the information memorized in the final address requested by the operator is obtained by the optical pickup unit 140 in the step S404.

When the answer in the step S404 is in the affirmative "YES", i.e., either the information memorized in the final address of the memory area of the optical disc 800 or the information memorized in the final address requested by the operator is received by the optical pickup unit 140 in the step S404, the optical pickup unit 140 is operated to stop to read the information memorized in the optical disc 800 retained by the turntable by receiving the light beam reflected by the optical disc 800 retained by the turntable 110.

When, on the other hand, the answer in the step S404 is in the negative "NO", i.e., either the information memorized in the final address of the memory area of the optical disc 800 or the information memorized in the final address requested by the operator is not received by the optical pickup unit 140 in the step S404, the coefficient value producing unit 350 of the CPU 300 is operated to judge whether or not the maximum value of the specific component of the exterior vibration detected by the acceleration sensor 210 in the predetermined period of time is larger than the predetermined threshold value in response to the results detected by the acceleration sensor 210 and the timer unit 340 in the step 405.

When the answer in the step S405 is in the affirmative "YES", i.e., the maximum value of the specific component of the exterior vibration detected by the acceleration sensor 210 in the predetermined period of time exceeds the threshold value, the coefficient value producing unit 350 of the CPU 300 is operated to produce the coefficient value equal to zero "0" in the step 406. the third control signal producing unit 360 is operated to judge whether or not the lens-shift value is larger than the predetermined threshold value in the step 407.

When the answer in the step S407 is in the affirmative "YES", i.e., the lens-shift value is larger than the predetermined threshold value, the third control unit 200 is operated to control the stepping motor 190 to have rotation shaft of the stepping motor 190 move around its central axis in response to the predetermined rotation angle. the control current information on the first to fourth control current values to be supplied to the stepping motor 190 is memorized by the third control signal producing unit 360 just before the third driver IC 200 is operated to control the stepping motor 190 to ensure that the rotation shaft of the stepping motor 190 fails to be rotatably move around its rotation axis in the step S408.

The third control signal producing unit 360 is then operated to calculate the products of the first to fourth coefficient values produced by the coefficient value producing unit 350 and the first to fourth control current values memorized by the third control signal producing unit 360. the third driver IC 200 is then operated to control the stepping motor 190 by supplying the first to fourth control current values respectively equal to the products of the first to fourth coefficient values produced by the coefficient value producing unit 350 and the first to fourth control current values memorized by the third control signal producing unit 360 to the stepping motor 190 in the step S409.

This leads to the fact that the rotation shaft of the stepping motor 190 fails to be rotatably moved around its rotation axis in response to the first to fourth control current values each equal to zero "0".

When the third control signal to have the rotation shaft of the stepping motor 190 fail to be rotatably moved around its central axis is received by the third driver IC 200, the third driver IC 200 is operated to control the stepping motor 190 to ensure that the rotation shaft of the stepping motor 190 fails to be moved around its central axis as assuming one of the specific rotational positions in response to the third control signal produced by the third control signal producing unit 200.

Figure 4:
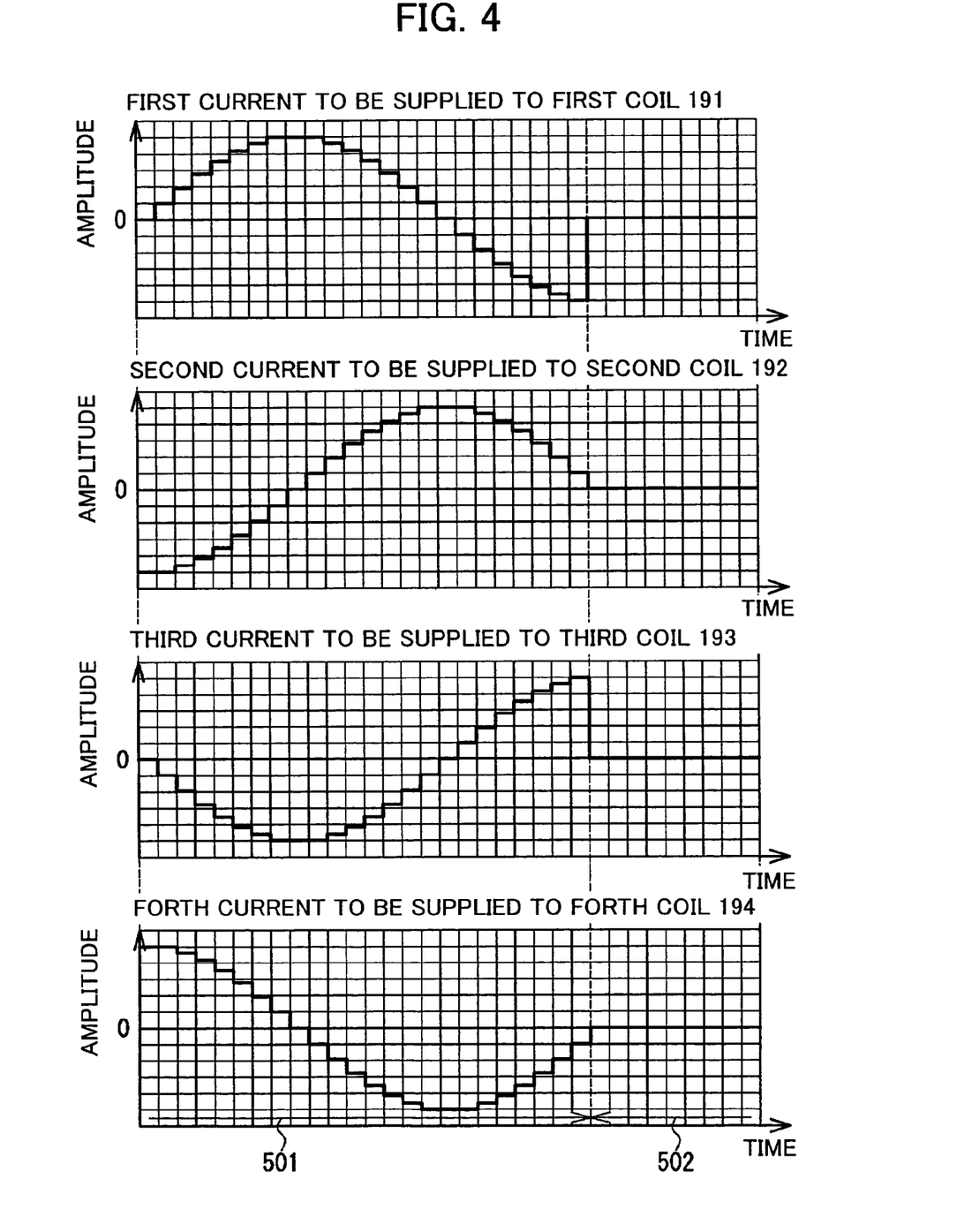
FIG. 4 is a graph showing the first to fourth control currents to be respectively supplied to the first to fourth coils of the stepping motor of the optical disc driving apparatus according to the preferred embodiment of the present invention.

The first to fourth control current values are, as shown in FIG. 4, respectively supplied to the first to fourth coils 191 to 194 of the stepping motor 190 by the third control unit 200.

Here, the rotation shaft of the stepping motor 190 is moved around its central axis without assuming one of the specific rotational positions in response to the first to fourth control current values respectively supplied to the first to fourth coils 191 to 194 of the stepping motor 190 in the period 501. On the other hand, the rotation shaft of the stepping motor 190 fails to be moved around its central axis as assuming one of the specific rotational positions in response to the first to fourth control current values each equal to zero "0" in the period 502.

When the answer in the step S407 is in the negative "NO", i.e., the lens-shift value is not larger than the predetermined threshold value, the third control signal producing unit 360 is operated to calculate the products of the first to fourth coefficient values produced by the coefficient value producing unit 350 and the first to fourth control current values memorized by the third control signal producing unit 360. the third driver IC 200 is then operated to control the stepping motor 190 by supplying the first to fourth control current values each equal to the products of the first to fourth coefficient values produced by the coefficient value producing unit 350 and the first to fourth control current values memorized by the third control signal producing unit 360 to the stepping motor 190 in the step S409.

This leads to the fact that the rotation shaft of the stepping motor 190 fails to be rotatably moved around its central axis in response to the first to fourth control current values each equal to zero "0".

Figure 5:
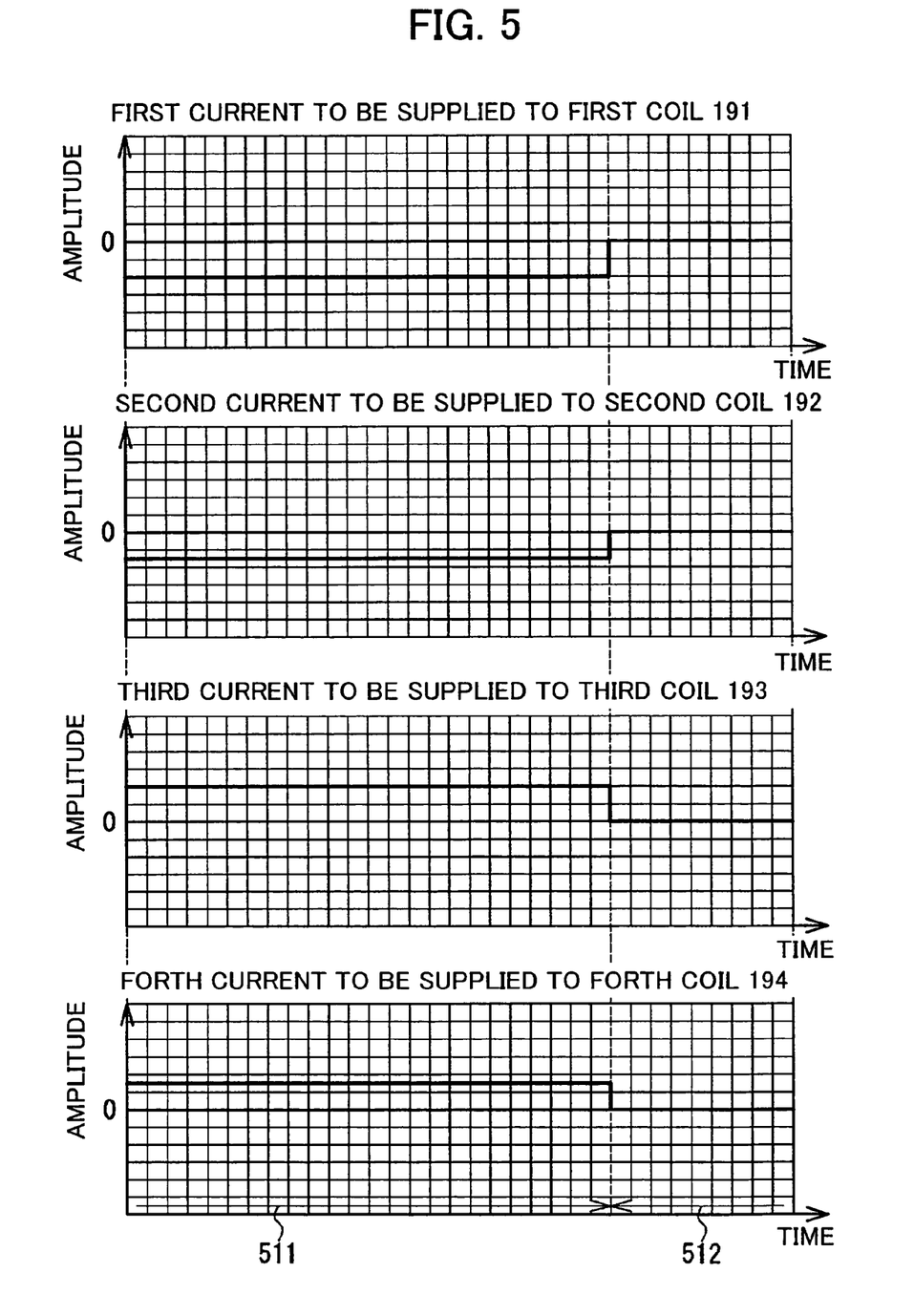
FIG. 5 is a graph showing the first to fourth control currents to be respectively supplied to the first to fourth coils of the stepping motor of the optical disc driving apparatus according to the preferred embodiment of the present invention.

The first to fourth control current values are, as shown in FIG. 5, respectively supplied to the first to fourth coils 191 to 194 of the stepping motor 190 by the third control unit 200.

Here, the first to fourth control current values are, as shown in FIG. 5, respectively supplied to the first to fourth coils 191 to 194 of the stepping motor 190 in the period 511. On the other hand, the rotation shaft of the stepping motor 190 fails to be moved around its central axis as assuming one of the specific rotational positions in response to the first to fourth control current values each equal to zero "0" in the period 512.

When the answer in the step S405 is in the negative "NO", i.e., the maximum value of the specific component of the exterior vibration detected by the acceleration sensor 210 in the predetermined period of time does not exceed the threshold value, the coefficient value producing unit 350 of the CPU 300 is operated to produce the first to fourth coefficient values in response to the data table (not shown) in the step S410. When the coefficient value producing unit 350 of the CPU 300 is operated to produce the first to fourth coefficient values, the third control signal producing unit 360 is operated to judge whether or not the lens-shift value is larger than the predetermined threshold value in the step 411.

When the answer in the step S411 is in the affirmative "YES", i.e., the lens-shift value is larger than the predetermined threshold value, the third control unit 200 is operated to control the stepping motor 190 to have rotation shaft of the stepping motor 190 move around its central axis in response to the predetermined rotation angle. the control current information on the first to fourth control current values to be respectively supplied to the first to fourth coils 191 to 194 of the stepping motor 190 is memorized by the third control signal producing unit 360 just before the third driver IC 200 is operated to control the stepping motor 190 to ensure that the rotation shaft of the stepping motor 190 fails to be rotatably move around its rotation axis in the step S408.

The third control signal producing unit 360 is then operated to calculate the products of the first to fourth coefficient values produced by the coefficient value producing unit 350 and the first to fourth control current values memorized by the third control signal producing unit 360. the third driver IC 200 is then operated to control the stepping motor 190 by supplying the first to fourth control current values respectively equal to the products of the first to fourth coefficient values produced by the coefficient value producing unit 350 and the first to fourth control current values memorized by the third control signal producing unit 360 to the stepping motor 190 in the step S409.

Figure 6:
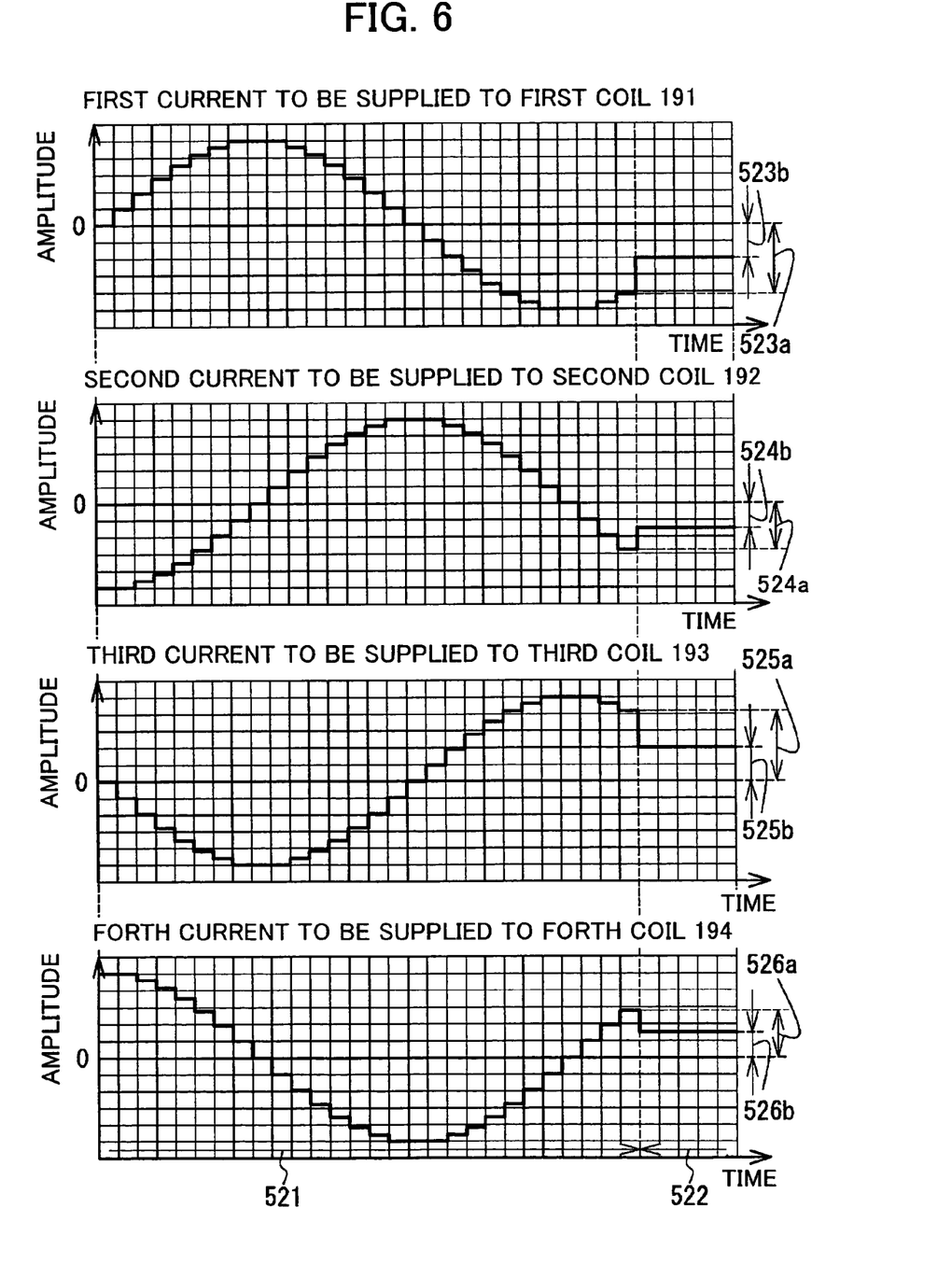
FIG. 6 is a graph showing the first to fourth control currents to be respectively supplied to the first to fourth coils of the stepping motor of the optical disc driving apparatus according to the preferred embodiment of the present invention.

The first to fourth control current values are, as shown in FIG. 6, respectively supplied to the first to fourth coils 191 to 194 of the stepping motor 190 by the third control unit 200.

Here, the rotation shaft of the stepping motor 190 is moved around its central axis under the condition that the first to fourth control current values are respectively supplied to the first to fourth coils 191 to 194 of the stepping motor 190 in the period 521 shown in FIG. 6. On the other hand, the rotation shaft of the stepping motor 190 fails to be moved around its central axis under the condition that the first to fourth control current values respectively equal to the products of the first to fourth coefficient values produced by the coefficient value producing unit 350 and the first to fourth control current values memorized by the third control signal producing unit 360 are respectively supplied to the first to fourth coils 191 to 194 of the stepping motor 190 in the period 522 shown in FIG. 6.

Here, the first to fourth values 523a to 526a are respectively equal to the first to fourth control current values to be respectively supplied to the first to fourth coils 191 to 194 of the stepping motor 360 just before the rotation shaft of the stepping motor 360 fails to be moved around its rotation axis. the first to fourth values 523b to 526b are respectively equal to the products of the first to fourth coefficient values produced by the coefficient value producing unit 350 and the first to fourth control current values memorized by the third control signal producing unit 360. the first ratio of the first value 523a to the first value 523b, the second ratio of the second value 524a to the second value 524b, the third ratio of the third value 525a to the third value 525b, the fourth ratio of the fourth value 526a to the fourth value 526b are respectively equal to the first to fourth coefficient values.

When the answer in the step S411 is in the negative "NO", i.e., the lens-shift value is not larger than the predetermined threshold value, the judgment is made by the third control signal producing unit 360 whether or not at least one of the first to fourth control current values to be respectively supplied to the first to fourth coils 191 to 194 of the stepping motor 190 is not equal to zero "0" in the step 412.

When the answer in the step S412 is in the affirmative "YES", i.e., each of the first to fourth control current values to be respectively supplied to the first to fourth coils 191 to 194 of the stepping motor 190 is equal to zero "0", the products of the first to fourth coefficient values produced by the coefficient value producing unit 350 and the first to fourth control current values memorized by the third control signal producing unit 360 is calculated by the third control signal producing unit 360. the first control signal producing unit 360 is then operated to produce the third control signal to ensure that the first to fourth control current values respectively equal to the products of the first to fourth coefficient values produced by the coefficient value producing unit 350 and the first to fourth control current values memorized by the third control signal producing unit 360 are respectively supplied to the first to fourth coils 191 to 194 of the stepping motor 190 by the third driver IC 200 in the step S409.

Figure 7:
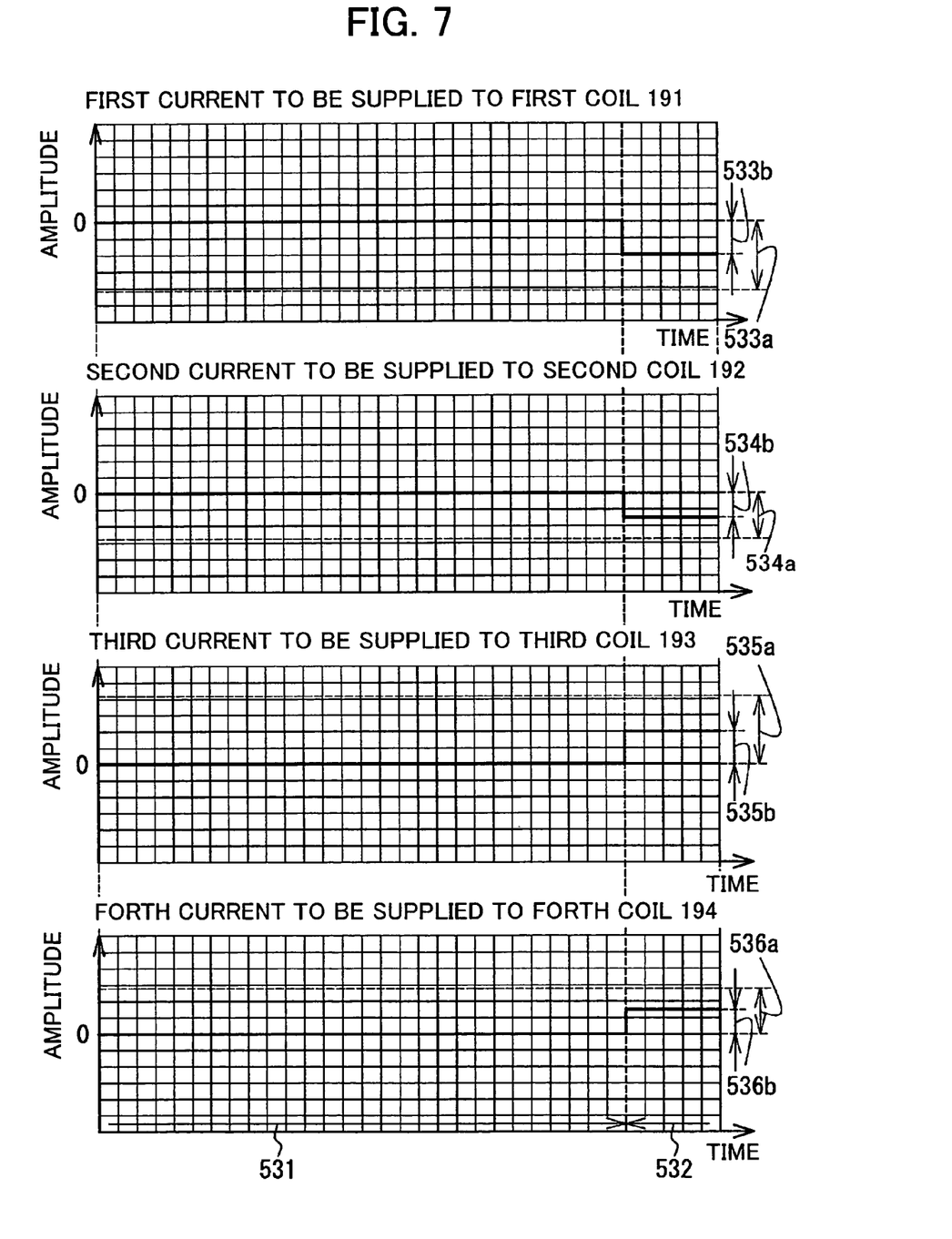
FIG. 7 is a graph showing the first to fourth control currents to be respectively supplied to the first to fourth coils of the stepping motor of the optical disc driving apparatus according to the preferred embodiment of the present invention.

The first to fourth control current values are, as shown in FIG. 7, respectively supplied to the first to fourth coils 191 to 194 of the stepping motor 190 by the third driver IC 200.

Here, the first to fourth control current values respectively equal to zeros "0" are respectively supplied to the first to fourth coils 191 to 194 of the stepping motor 190 in the period 531 shown in FIG. 7. On the other hand, the first to fourth control current values respectively equal to the products of the first to fourth coefficient values produced by the coefficient value producing unit 350 and the first to fourth control current values memorized by the third control signal producing unit 360 are respectively supplied to the first to fourth coils 191 to 194 of the stepping motor 190 in the period 532 shown in FIG. 7.

Here, the first to fourth values 533a to 536a are respectively equal to the first to fourth control current values to be respectively supplied to the first to fourth coils 191 to 194 of the stepping motor 360 just before the rotation shaft of the stepping motor 360 fails to be moved around its rotation axis. the first to fourth values 533b to 536b are respectively equal to the products of the first to fourth coefficient values produced by the coefficient value producing unit 350 and the first to fourth control current values memorized by the third control signal producing unit 360. the first ratio of the first value 533a to the first value 533b, the second ratio of the second value 534a to the second value 534b, the third ratio of the third value 535a to the third value 535b, the fourth ratio of the fourth value 536a to the fourth value 536b are respectively equal to the first to fourth coefficient values.

When the answer in the step S412 is in the negative "NO", i.e., at least one of the first to fourth amplitude values of the first to fourth control currents to be respectively supplied to the first to fourth coils 191 to 194 of the stepping motor 190 are not respectively equal to zeroes "0", the third control signal producing unit 360 is operated to produce the third control signal to ensure that the first to fourth control currents judged in the step S412 are respectively supplied to the first to fourth coils 191 to 194 of the stepping motor 190 by the third driver IC 170 in the step S413.

Figure 8:
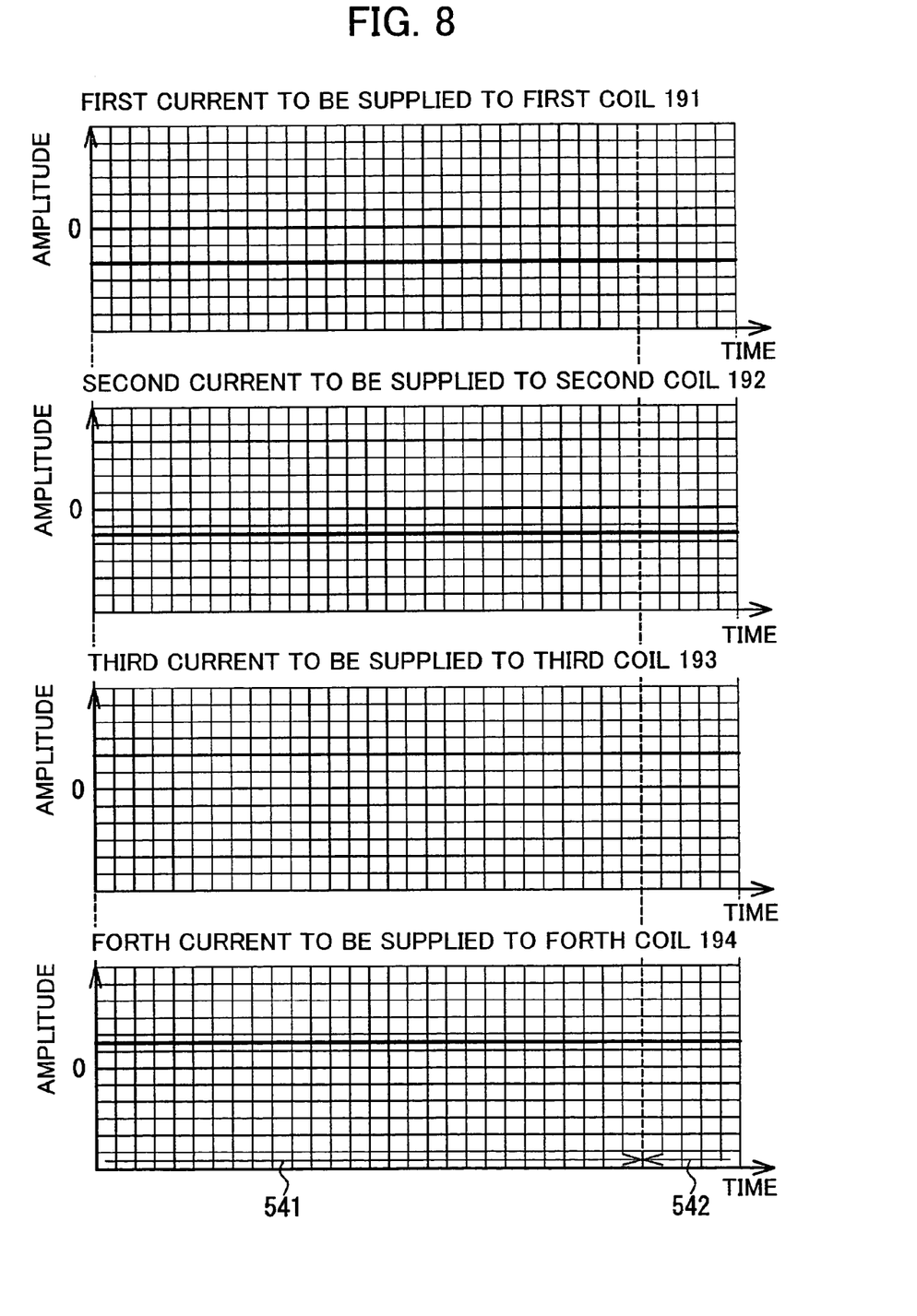
FIG. 8 is a graph showing the first to fourth control currents to be respectively supplied to the first to fourth coils of the stepping motor of the optical disc driving apparatus according to the preferred embodiment of the present invention.

The first to fourth control currents 191 to 194 are shown in FIG. 8 as being respectively supplied to the first to fourth coils 191 to 194 of the stepping motor 190 by the third driver IC 200. The first to fourth control currents 191 to 194 are, as shown in FIG. 8, respectively not supplied to the first to fourth coils 191 to 194 of the stepping motor 190 in a period of time 541. the first to fourth control currents 191 to 194 are, on the other hand, respectively supplied to the first to fourth coils 191 to 194 of the stepping motor 190 in a period of time 542.

When the third driver IC 200 is operated to control the stepping motor 190 by supplying the first to fourth control currents respectively equal to the products of the first to fourth coefficient values produced by the coefficient value producing unit 350 and the first to fourth control current values memorized by the third control signal producing unit 360 to the first to fourth coils 191 to 194 of the stepping motor 190 in the step S409, the step S409 proceeds to the step S401.

When the third driver IC 200 is operated to control the stepping motor 190 by supplying the first to fourth control currents judged in the step S412 to the first to fourth coils 191 to 194 of the stepping motor 190 in the step S413, the step S413 proceeds to the step S401.

When the information memorized in the optical disc 800 retained by the turntable 110 is read by the optical pickup unit 140, the optical disc driving apparatus 100 can reduce the Joule heat produced in each of the first to fourth coils 191 to 194 of the stepping motor 190 to ensure that the rotation shaft of the stepping motor 190 fails to be rotatably moved around its rotation axis, i.e., the first to fourth amplitude values of the first to fourth control currents to be respectively supplied to the first to fourth coils 191 to 194 of the stepping motor 190 are respectively reduced to the minimum values each in association with the amplitude of the exterior vibration to be detected by the acceleration sensor 210 under the condition that the judgment is made that the amplitude of the exterior vibration detected by the acceleration sensor 210 does not exceed the predetermined maximum value in the predetermined period of time, on the other hand, each of the first to fourth amplitude values of the first to fourth control currents to be respectively supplied to the first to fourth coils 191 to 194 of the stepping motor 190 is kept supplied without being reduced to the minimum value in association with the amplitude of the exterior vibration to be detected by the acceleration sensor 210 under the condition that the judgment is made that the amplitude of the exterior vibration detected by the acceleration sensor 210 exceeds the predetermined maximum value in the predetermined period of time.

From the above detailed description, it will be understood that the first to fourth amplitude values of the first to fourth control currents to be respectively supplied to the first to fourth coils 191 to 194 of the stepping motor 190 are decided by the third driver IC 200 in response to the amplitude of the exterior vibration detected by the acceleration sensor 210 when the third driver IC 200 is operated to control the stepping motor 190 to ensure that the rotation shaft of the stepping motor 190 fails to be rotatably moved around its rotation axis in the step S409.

This leads to the fact that the optical disc driving apparatus 100 can drive the optical disc 800 to ensure that the information memorized in each of the imaginary tracks of the optical disc 800 is read by the optical pickup unit 140 in an operation temperature larger than a predetermined upper limit on an operation temperature with respect to the conventional optical disc driving apparatus by reason that the first to fourth amplitude values of the first to fourth control currents to be respectively supplied to the first to fourth coils 191 to 194 of the stepping motor 190 are respectively reduced to the relatively lower values in response to the amplitude of the exterior vibration detected by the acceleration sensor 210, i.e., the calorific values respectively produced in the first to fourth coils 191 to 194 of the stepping motor 190 are respectively reduced to the relatively lower values in response to the amplitude of the exterior vibration detected by the acceleration sensor 210 when the rotation shaft of the stepping motor 190 fails to be rotatably moved around its rotation axis.

The optical disc driving apparatus 100 can reduce the calorific value produced in the first to fourth coils 191 to 194 of the stepping motor 190 to the relatively lower values respectively smaller than the calorific values respectively produced in the first to fourth coils of the stepping motor of the conventional optical disc driving apparatus by reason that the first to fourth amplitude values of the first to fourth control currents to be respectively supplied to the first to fourth coils 191 to 194 of the stepping motor 190 are respectively reduced to the relatively lower values in response to the amplitude of the exterior vibration to be detected by the acceleration sensor 210.

The optical disc driving apparatus 100 can reduce the calorific values respectively produced in the first to fourth coils 191 to 194 of the stepping motor 190 to the relatively lower values respectively smaller than the calorific values respectively produced in the first to fourth coils of the stepping motor of the conventional optical disc driving apparatus by reason that the third driver IC 200 is adapted to control the stepping motor 190 by using the detent torque of the stepping motor 190 without supplying the first to fourth control currents to the first to fourth coils 191 to 194 of the stepping motor 190 to ensure that the rotation shaft of the stepping motor 190 fails to be rotatably moved around its rotation axis under the condition that the mean value of the specific component of the exterior vibration detected by the acceleration sensor 210 in a predetermined period of time is smaller than the predetermined threshold value.

The optical disc driving apparatus 100 can reduce the calorific values respectively produced in the first to fourth coils 191 to 194 of the stepping motor 190 to the relatively lower values respectively smaller than the calorific values respectively produced in the first to fourth coils of the stepping motor of the conventional optical disc driving apparatus by reason that the first to fourth control currents respectively equal to the products of the first to fourth coefficient values produced by the coefficient value producing unit 350 and the first to fourth control current values memorized by the third control signal producing unit 360 are respectively supplied to the first to fourth coils 191 to 194 of the stepping motor 190 by the third driver IC 200 when the rotation shaft of the stepping motor 190 fails to be rotatably moved around its rotation axis.

Here, the first to fourth coefficient values produced by the coefficient value producing unit 350 are equal to one another.

The optical disc driving apparatus 100 can drive the optical disc 800 to ensure that the information memorized in each of the imaginary tracks of the optical disc 800 is read by the optical pickup unit 140 by reason that the third driver IC 200 is adapted to control the stepping motor 190 by switching the first to fourth control currents to be respectively supplied to the first to fourth coils 191 to 194 of the stepping motor 190 to the first to fourth control currents respectively equal to the products of the first to fourth coefficient values produced by the coefficient value producing unit 350 and the first to fourth control current values memorized by the third control signal producing unit 360 without changing the first to fourth phase angles of the first to fourth control currents respectively supplied to the first to fourth coils 191 to 194 of the stepping motor 190 when the rotation shaft of the stepping motor 190 fails to be rotatably moved around its rotation axis.

The optical disc driving apparatus 100 can reduce the calorific values respectively produced in the first to fourth coils 191 to 194 of the stepping motor 190 to the relatively lower values respectively smaller than the calorific values respectively produced in the first to fourth coils of the stepping motor of the conventional optical disc driving apparatus by reason that the third driver IC 200 is adapted to control the stepping motor 190 by supplying the first to fourth control currents respectively equal to the products of the first to fourth coefficient values produced by the coefficient value producing unit 350 and the first to fourth control current values memorized by the third control signal producing unit 360 to the first to fourth coils 191 to 194 of the stepping motor 190 in response to the amplitude of the exterior vibration to be detected by the acceleration sensor 210.

While there has been described in the forgoing embodiment about the fact that the coefficient value producing unit 350 is adapted to produce first to fourth coefficient values in association with the amplitude of the exterior vibration by judging whether or not the mean value of the exterior vibration detected by the acceleration sensor 210 in a predetermined period of time is larger than a predetermined threshold value in response to the results detected by the acceleration sensor 210 and the timer unit 340, the coefficient value producing unit 350 may be adapted to produce first to fourth coefficient values in association with the amplitude of the exterior vibration by judging whether or not the amplitude of the exterior vibration detected by the acceleration sensor 210 in the predetermined period of time is larger than the predetermined threshold value in response to the results detected by the acceleration sensor 210 and the timer unit 340.

The coefficient value producing unit 350 may be adapted to produce first to fourth coefficient values in association with the amplitude of the exterior vibration by judging whether or not the maximum value of the exterior vibration detected by the acceleration sensor 210 in the predetermined period of time is larger than the predetermined threshold value in response to the results detected by the acceleration sensor 210 and the timer unit 340.

The coefficient value producing unit 350 may be adapted to produce first to fourth coefficient values in association with the amplitude of the exterior vibration by judging whether or not the amplitude of the exterior vibration detected by the acceleration sensor 210 in the predetermined period of time is larger than the predetermined threshold value in response to the results detected by the acceleration sensor 210 at a point in time.

While there has been described in the forgoing embodiment about the fact that the coefficient value producing unit 350 is adapted to assume two different operational states consisting of a first operational state to produce first to fourth coefficient values each equal to a numerical value "0" under the condition that the mean value of the exterior vibration detected by the acceleration sensor 210 in a predetermined period of time is smaller than the predetermined threshold value, and a second operational state to produce first to fourth coefficient values respectively equal to the products of the first to fourth coefficient values produced by the coefficient value producing unit 350 and the first to fourth control current values memorized by the third control signal producing unit 360 under the condition that the mean value of the exterior vibration detected by the acceleration sensor 210 in the predetermined period of time exceeds the predetermined threshold value, the coefficient value producing unit 350 may be adapted to output predetermined values to the third control signal producing unit 200.

While there has been described in the forgoing embodiment about the fact that the optical pickup unit 140 is adapted to read the information memorized in the optical disc 800 retained by the turntable 110, the optical pickup unit 140 may be adapted to memorize the information in the optical disc 800 retained by the turntable 110.

The electronic apparatus is not shown as comprising a optical disc driving apparatus 100 for driving a optical disc. the electronic apparatus is instilled into an automotive vehicle to ensure to be operated by an operator in a relatively high temperature larger than an upper limit of an operation temperature of the conventional optical disc driving apparatus to be instilled into an automotive vehicle.

As will be seen from the foregoing description, the optical disc driving apparatus can reduce the calorific value produced in the first to fourth coils 191 to 194 of the stepping motor 190 to ensure that the rotation shaft of the stepping motor 190 fails to be rotatably moved around its rotation axis.

While the subject invention has been described with relation to the preferred embodiment, various modifications and adaptations thereof will now be apparent to those skilled in the art as far as such modifications and adaptations fall in the scope of the appended claims intended to be covered thereby.

What is claimed is:

1. An optical disc driving apparatus, comprising:
   a stepping motor having a plurality of coils;
   a detecting unit for detecting an exterior vibration while being vibrated in response to said exterior vibration;
   a driver IC for supplying control currents for controlling said stepping motor to said coils of said stepping motor to have said stepping motor assume two different operation states consisting of a first operation state to drive said stepping motor to ensure that said rotation shaft of stepping motor is rotatably moved around its rotation axis, and a second operation state to drive said stepping motor to ensure that said rotation shaft of stepping motor fails to be rotatably moved around its rotation axis; and
   a control signal producing unit for producing a control signal to have said driver IC supply control currents in association with said exterior vibration detected by said detecting unit to said coils of said stepping motor to have said stepping motor assume said second operation state after judging whether or not said exterior vibration detected by said detecting unit is larger in amplitude than a predetermined threshold level.

2. An optical disc driving apparatus for driving an optical disc having a central axis, comprising:
   a turntable having a central axis, said turntable being adapted to retain an optical disc under the condition that said central axis of said turntable is axially aligned with said central axis of said optical disc;
   an optical pickup unit movable toward and away from said central axis of said turntable, said optical pickup unit being adapted to write or retrieve information from said optical disc retained by said turntable;

a stepping motor having a plurality of coils;

a detecting unit for detecting an exterior vibration while being vibrated in response to said exterior vibration;

a driver IC for supplying control currents for controlling said stepping motor to said coils of said stepping motor to have said stepping motor assume two different operation states consisting of a first operation state to drive said stepping motor to ensure that said optical pickup unit is moved toward and away from said central axis of said turntable, and a second operation state to drive said stepping motor to ensure that said optical pickup unit fails to be moved toward and away from said central axis of said turntable; and a control signal producing unit for producing a control signal to have said driver IC supply control currents in association with said exterior vibration detected by said detecting unit to said coils of said stepping motor to have said stepping motor assume said second operation state after judging whether or not said exterior vibration detected by said detecting unit is larger in amplitude than a predetermined threshold level.

3. An optical disc driving apparatus as set forth in claim 2, in which said detecting unit is adapted to detect said exterior vibration while being vibrated in the direction toward said central axis of said turntable from said optical pickup unit and vice versa.

4. An optical disc driving apparatus as set forth in claim 2, in which said control signal producing unit is adapted to produce a control signal to have said stepping motor assume said second operation state after deciding whether or not to supply said control currents to said coils of said stepping motor on the basis of results detected by said detecting unit.

5. An optical disc driving apparatus as set forth in claim 2, in which said control signal producing unit is adapted to produce a control signal to have said stepping motor assume said second operation state after deciding whether or not to supply said control currents to said coils of said stepping motor by judging whether or not said exterior vibration detected by said detecting unit is larger in amplitude than said predetermined threshold level in a predetermined period of time.

6. An optical disc driving apparatus as set forth in claim 2, in which said control signal producing unit is adapted to produce a control signal to have said stepping motor assume said second operation state by calculating products of predetermined coefficient values and said last control currents to be respectively supplied to said coils of said stepping motor just before having said stepping motor assume said second operation state, said predetermined coefficient values being equal to one another, and before having said driver IC supply said control currents respectively equal to said products of said predetermined coefficient values and said control currents memorized therein.

7. An optical disc driving apparatus as set forth in claim 2, in which said control signal producing unit is adapted to produce a control signal to have said stepping motor assume said second operation state after producing coefficient values in response to results detected by said detecting unit, calculating products of said coefficient values and said last control currents to be respectively supplied to said coils of said stepping motor just before having said stepping motor assume said second operation state, said predetermined coefficient values being equal to one another, and having said driver IC supply said control currents respectively equal to said products of said predetermined coefficient values and said control currents memorized therein.

8. An optical disc driving apparatus as set forth in claim 2, in which said control signal producing unit is adapted to produce a control signal to have said stepping motor assume said second operation state when any one of said control currents to be respectively supplied by said driver IC to said coils of said stepping motor is equal in amplitude to an extreme value.

9. An electronic apparatus to be installed into an automotive vehicle, said electronic apparatus comprising an optical disc driving apparatus for driving an optical disc having a central axis, comprising:

a turntable having a central axis, said turntable being adapted to retain an optical disc under the condition that said central axis of said turntable is axially aligned with said central axis of said optical disc;

an optical pickup unit movable toward and away from said central axis of said turntable, said optical pickup unit being adapted to write and retrieve information from said optical disc retained by said turntable;

a stepping motor having a plurality of coils;

a detecting unit for detecting an exterior vibration while being vibrated in response to said exterior vibration;

a driver IC for supplying control currents for controlling said stepping motor to said coils of said stepping motor to have said stepping motor assume two different operation states consisting of a first operation state to drive said stepping motor to ensure that said optical pickup unit is moved toward and away from said central axis of said turntable, and a second operation state to drive said stepping motor to ensure that said optical pickup unit fails to be moved toward and away from said central axis of said turntable; and a control signal producing unit for producing a control signal to have said driver IC supply control currents in association with results detected by said detecting unit to said coils of said stepping motor to have said stepping motor assume said second operation state after judging whether or not said exterior vibration detected by said detecting unit is larger in amplitude than a predetermined threshold level.

* * * * *

UNITED STATES PATENT AND TRADEMARK OFFICE
CERTIFICATE OF CORRECTION

PATENT NO. : 7,046,604 B2
APPLICATION NO. : 10/772,679
DATED : May 16, 2006
INVENTOR(S) : Shigeta et al.

It is certified that error appears in the above-identified patent and that said Letters Patent is hereby corrected as shown below:

Column 5:
Line 7, pleae delete "the", and insert therefor --The--.

Line 30, please delete "the", and insert therefor --The--.

Line 38, please delete the first occurrence of "the", and insert therefor --The--.

Column 7:
Line 13, please delete the first occurrence of "the", and insert therefor --The--.

Column 8:
Line 36, please delete the first occurrence of "the", and insert therefor --The--.

Column 9:
Line 3, please delete the first occurrence of "the", and insert therefor --The--.

Line 5, please delete the second occurrence of "the", and insert therefor --The--.

Line 7, please delete the second occurrence of "the", and insert therefor --The--.

Line 40, please delete "405", and insert therefor --S405--.

Line 47, please delete "406", and insert therefor --S406--.

Column 8 (continued):
Line 47, please delete the second occurrence of "the", and insert therefor --The--.

Line 50, please delete "407", and insert therefor --S407--.

Line 56, please delete the second occurrence of "the", and insert therefor --The--.

Column 10:
Line 1, please delete the second occurrence of "the", and insert therefor --The--.

Line 43, please delete the first occurrence of "the", and insert therefor --The--.

UNITED STATES PATENT AND TRADEMARK OFFICE
CERTIFICATE OF CORRECTION

PATENT NO.        : 7,046,604 B2                        Page 2 of 2
APPLICATION NO. : 10/772,679
DATED             : May 16, 2006
INVENTOR(S)       : Shigeta et al.

It is certified that error appears in the above-identified patent and that said Letters Patent is hereby corrected as shown below:

Column 11:

Line 17, please delete the second occurrence of "the", and insert therefor --The--.

Line 30, please delete the second occurrence of "the", and insert therefor --The--.

Line 61, please delete "the", and insert therefor --The--.

Line 65, please delete the first occurrence of "the", and insert therefor --The--.

Column 12:

Line 19, please delete "the", and insert therefor --The--.

Line 48, please delete "the", and insert therefor --The--.

Line 52, please delete the first occurrence of "the", and insert therefor --The--.

Column 13:

Line 7, please delete "the", and insert therefor --The--.

Column 16:

Line 18, please delete "the", and insert therefor --The--.

Signed and Sealed this

Eighth Day of August, 2006

JON W. DUDAS
*Director of the United States Patent and Trademark Office*